(12) United States Patent  
Bianco

(10) Patent No.: US 9,045,051 B2
(45) Date of Patent: Jun. 2, 2015

(54) SYSTEM FOR IDENTIFYING AN ELECTRIC VEHICLE CONNECTED TO ELECTRIC VEHICLE SERVICE EQUIPMENT

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 436 days.

(21) Appl. No.: 13/533,143

(22) Filed: Jun. 26, 2012

(65) Prior Publication Data

US 2013/0015815 A1    Jan. 17, 2013

Related U.S. Application Data

(60) Provisional application No. 61/507,303, filed on Jul. 13, 2011.

(51) Int. Cl.
*H02J 7/00* (2006.01)
*B60L 11/18* (2006.01)

(52) U.S. Cl.
CPC .................................. *B60L 11/1824* (2013.01)

(58) Field of Classification Search
CPC ... Y02T 90/14; Y02T 10/7005; Y02T 90/128; Y02T 10/7088; Y02T 90/163
USPC ......................................................... 320/109
See application file for complete search history.

(56) References Cited

U.S. PATENT DOCUMENTS

| 5,341,280 | A | 8/1994 | Divan et al. |
| 5,758,414 | A * | 6/1998 | Ehrenfels ........................ 29/857 |
| 8,075,329 | B1 * | 12/2011 | Janarthanam et al. ........ 439/304 |
| 2004/0138836 | A1 * | 7/2004 | Ishishita et al. ................. 702/63 |
| 2010/0268406 | A1 | 10/2010 | Ito et al. |
| 2010/0289516 | A1 * | 11/2010 | Mitsutani et al. ........ 324/764.01 |
| 2011/0029144 | A1 | 2/2011 | Muller et al. |
| 2011/0043355 | A1 | 2/2011 | Chander et al. |
| 2011/0057611 | A1 * | 3/2011 | Nakaso et al. ................ 320/109 |
| 2011/0074351 | A1 | 3/2011 | Bianco et al. |
| 2011/0300728 | A1 * | 12/2011 | Katagiri et al. ............... 439/147 |

OTHER PUBLICATIONS

Search Report for International Patent Application No. PCT/US12/46200.

* cited by examiner

*Primary Examiner* — Arun Williams
(74) *Attorney, Agent, or Firm* — Alix, Yale & Ristas, LLP

(57) ABSTRACT

A system for identifying an electric vehicle connected to electric vehicle service equipment (EVSE) and which involves RF communication exploits the OBDM of the electric vehicle as well as the auto-CAM system. Power is applied from the EVSE to supply electric power and the flow of current to the battery charger is detected. The VIN and a power-on signal is then transmitted by RF to the EVSE transceiver. Power is removed from the EVSE to the electric vehicle. A VIN and a power-off signal is transmitted to the EVSE and processed to confirm the identity of the connected electric vehicle. Power is then re-applied to the EVSE to charge the battery power supply.

14 Claims, 4 Drawing Sheets

SYSTEM FOR IDENTIFYING AN ELECTRIC VEHICLE CONNECTED TO ELECTRIC VEHICLE SERVICE EQUIPMENT

CROSS REFERENCE TO RELATED APPLICATION

This application claims the priority of U.S. Provisional Patent Application No. 61/507,303 filed on Jul. 13, 2011, the entire disclosure of which is incorporated herein by reference.

BACKGROUND

This disclosure relates generally to electric vehicles and electric vehicle service equipment employed for charging the on-board batteries of the electric vehicle. More particularly, this disclosure relates to methods and apparatus for identifying the electric vehicle which is being charged at a charging station.

When charging an electric vehicle at a publicly accessible facility, it is important that data concerning the electric vehicle be automatically obtained while the vehicle is being charged. Such data preferably comprises, but is not limited to, the vehicle identification number (VIN), the type and make of the vehicle, the current mileage and the state of the charge of the on-board batteries.

Various devices have been developed to connect to the on-board diagnostic monitor (OBDM) port which communicates with the electric vehicle on-board computers and an external computer, either through a direct hard-wire communication or via radio frequency or infrared signals. When radio frequency signals are employed, it is necessary to pair the devices so as to prevent a conflict with similar devices in the vicinity.

The present disclosure relates to a system for identifying an electric vehicle connected to electric vehicle service equipment (EVSE) and which system can be efficiently implemented into an electric vehicle with a minimal modification. The system employs existing technology, is very simple to install and is implemented as an add-on to any electric vehicle with an OBDM port. The system is very low-cost and is ideal for implementing automatic charging control and billing for electricity. Furthermore, the identifying system can be readily adapted for use for car share or car rental purposes.

SUMMARY

A current sensing device such as, but not limited to, a sensing coil or a flux sensor is added to one of the wires supplying the power from the EVSE to the electric vehicle. The current sensing device functions to ascertain when current is flowing to the electric vehicle to charge the electric vehicle battery power supply.

The system efficiently exploits the conventional functions of the EVSE, the vehicle charging system, and the OBDM. When an electric vehicle charging station, or EVSE, is connected to an electric vehicle and the communications via the pilot wire are proper, power is initially supplied to the electric vehicle power lines. When the automobile communication activation method (auto-CAM) senses power flowing in the electric lines, it immediately obtains the VIN of the electric vehicle from the OBDM. The VIN and a "power-on" message are then transmitted from the electric vehicle via an RF transmitter.

The EVSE receives the VIN and the "power-on" message shortly after the EVSE applies the power to the electric vehicle. The EVSE then promptly removes the power from the electric vehicle. The current sensor communicates with the auto-CAM and triggers the auto-CAM to transmit the VIN and a "power-off" message via RF communication. When the EVSE receives the "power-off" message and the same VIN, it compares and confirms the pairing of the EVSE and the electric vehicle to which it is connected. If the electric vehicle is an approved vehicle for receiving power from the EVSE, the EVSE will restore power to the electric vehicle and the normal charging sequence will proceed.

DETAILED DESCRIPTION

Figure 1:
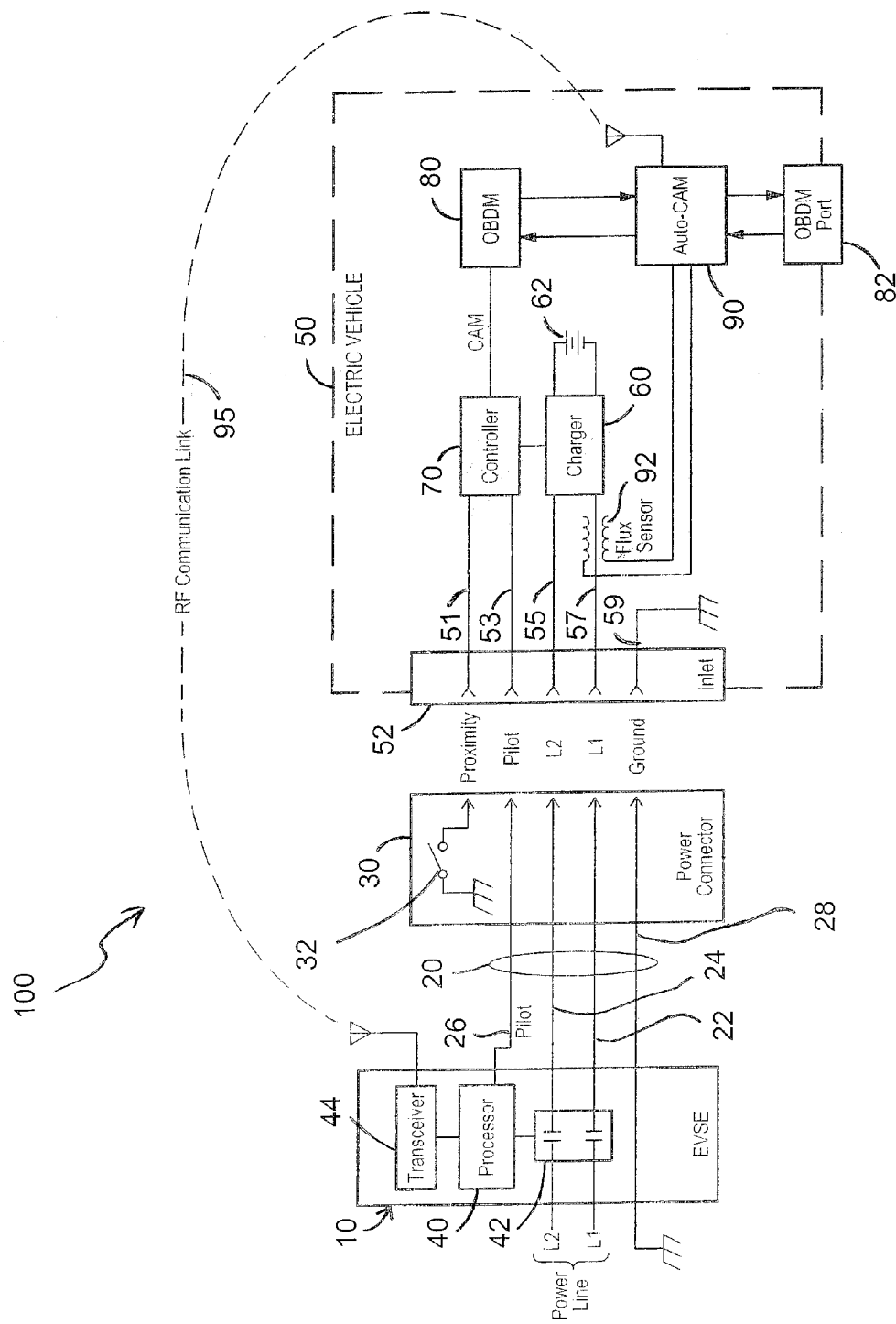
FIG. 1 is an annotated schematic view of a system for identifying an electric vehicle connected to an EVSE.
Figure 2:
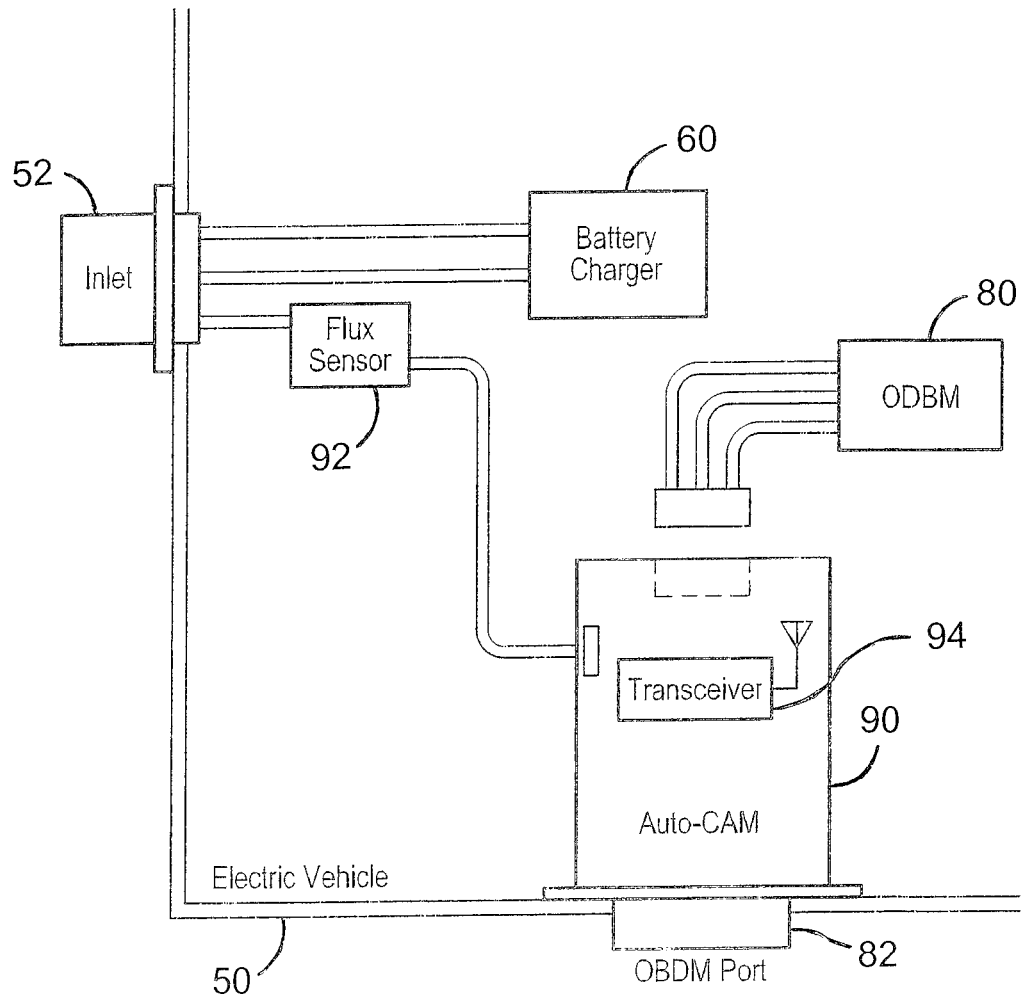
FIG. 2 is an annotated schematic view of a portion of the electric vehicle for the system of FIG. 1, including a modified module as implemented in connection with the battery charging system and the OBDM of the electric vehicle.
Figure 3A:
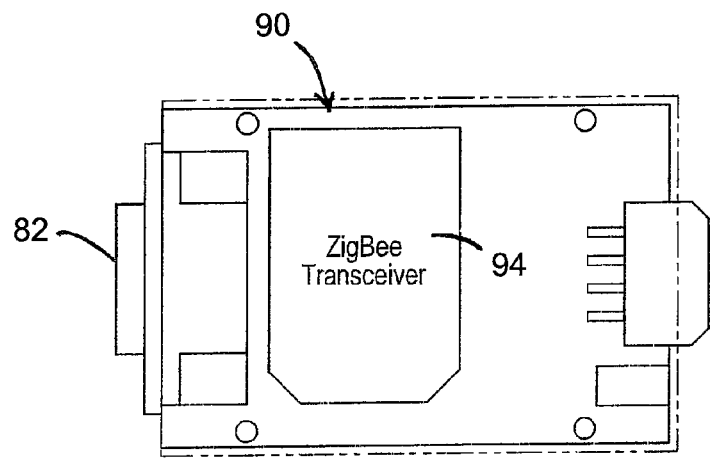
FIG. 3A is an annotated top view of the module of FIG. 2 with the cover removed.
Figure 3B:
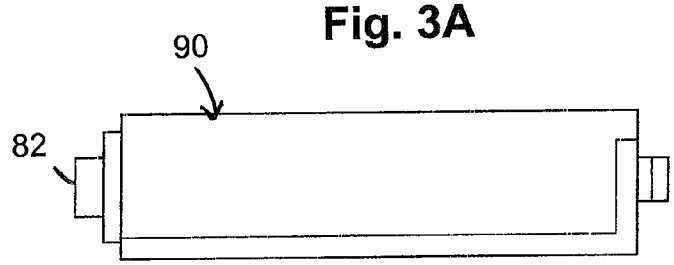
FIG. 3B is a side elevational view of the module of FIG. 3A.
Figure 3C:
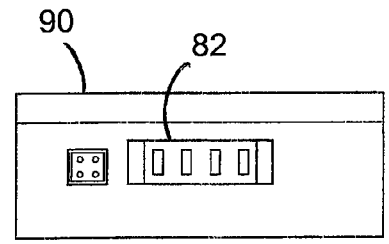
FIG. 3C is an end view of the module of FIG. 3A.
Figure 3D:
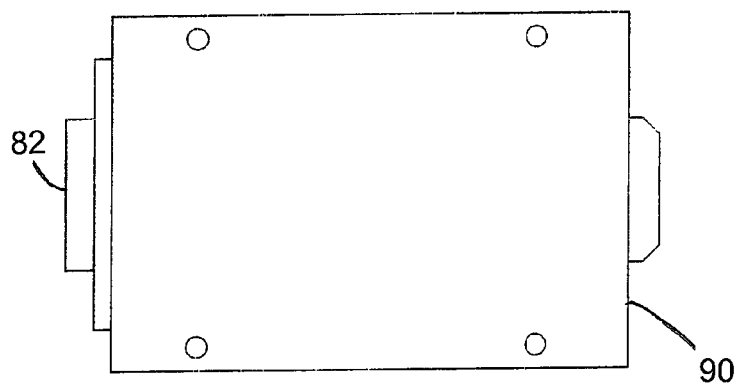
FIG. 3D is a bottom plan view of the module of FIG. 3A.

With reference to the drawings wherein like numerals represent like parts throughout the several figures, a system for identifying an electric vehicle connected to an EVSE 10 is generally designated by the numeral 100. The system 100 automatically functions to identify the connected vehicle and to transmit and receive data which allows a confirmed properly authorized electric vehicle 50 to be charged by the EVSE 10. The system 100 also automatically provides data for control and billing of the electric charging process.

The EVSE 10 employs a power cable 20 with a connector 30 which connects to the electric vehicle 50 for supplying power to a charger 60 to charge the on-board batteries 62. The cable 20 includes wires 22, 24, 26 and 28 for the power lines L1, L2, a pilot wire and a ground connection, respectively. The EVSE 10 also includes a processor 40 which controls a line contactor 42 interposed across power lines L1, L2. The contactor 42 controls the supply of power to the connector 30 and ultimately to the charger 60 of the electric vehicle 50. The processor 40 also communicates with an RF transceiver 44 which receives and transmits RF communication signals.

The power connector 30 also includes a proximity switch 32. The electric vehicle inlet 52 includes a proximity sensor line 51, a pilot communication line 53, and power lines 55 and 57, as well as a ground line 59. The power lines 55 and 57 connect lines L1 and L2, respectively, to supply power to the charger 60. The proximity line 51 and the pilot line 53 connect with the controller 70 for the battery charger 60.

The controller 70 communicates with the OBDM 80. The OBDM 80 is also in two-way communication with the automobile communication activation method (auto-CAM) module 90. Module 90 is also in two-way communication with the OBDM port 82 of the electric vehicle.

A current sensor 92, which is preferably a flux sensor, is mounted to line 59 and communicates with the auto-CAM module 90. The auto-CAM module 90 also communicates with an RF transceiver 94. The power lines 55 and 57 ultimately connect with the battery charger 60 for charging the on-board battery supply 62. The auto-CAM transceiver 94 provides an RF communication link 95 with the transceiver 44 of the EVSE.

The EVSE 10 connects with the electric vehicle via the power cable wherein the connector 30 attaches to the electric vehicle inlet 52. The electric vehicle controller 70 detects the proximity signal on line 51 and establishes communications with the EVSE via the protocol transmitted on the pilot line 53. Upon establishing proper communication between the EVSE 10 and the electric vehicle 50, the EVSE processor 40 closes the contactor 42 and applies voltage to power lines (L1) 22 and (L2) 24. When the current flows through line 57 to the battery charger 60, the flux sensor 92 detects the presence of current flowing in line 57. The detection signal from the flux sensor 92 activates the processor on the auto-CAM module 90. The auto-CAM module 90 then obtains the VIN from the OBDM 80.

Figure 4:
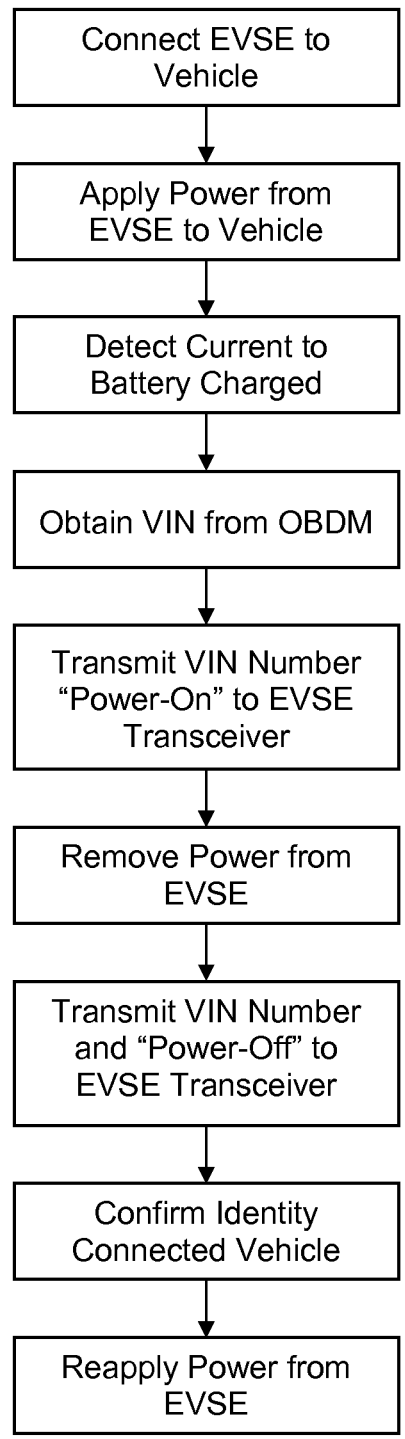
FIG. 4 is a flow chart illustrating steps of a method for identifying an electric vehicle connected to an EVSE.

With additional reference to FIG. 4, when the auto-CAM module 90 receives the VIN from the OBDM 80, the electric vehicle VIN and a "power-on" message are transmitted from the connected electric vehicle via the RF link 95 to the RF receiver of transceiver 44 located in the EVSE 10.

Shortly after the VIN and the "power-on" message are passed to the EVSE processor 40, the processor generates a signal to open contactor 42. The opened contactor 42 removes power from the power cable and its connector 30 and from the power line 57 detected by the flux sensor 92.

When the auto-CAM module 90 detects a loss of power from the flux sensor 92 current sensing signal, the auto-CAM module 90 transmits the electric vehicle VIN and a "power-off" signal indicating that power is not supplied for charging the on board battery supply. The "power-off" signal also refers to or may constitute a "no power", "loss of power" or equivalent message from transceiver 84 via the RF link 95 to the RF receiver 44 on EVSE 10. The "power-off" message and the VIN arrive shortly after the power has been removed by the EVSE. This message confirms that EVSE 10 is connected to the identified electric vehicle 50.

Power is again applied from the EVSE 10 to the electric vehicle 50 and the charging cycle proceeds as normal.

The EVSE 10 then transmits a request for data with the VIN via the RF transmitter and transceiver 44 to all the RF receivers in the vicinity. The RF receiver 94 on the auto-CAM module 90 receives the request for data. If the VIN and the request matches the VIN of its associated electric vehicle 50, the auto-CAM module 80 obtains the requested data from the OBDM 80 and transmits it via RF transceiver 94 together with the electric vehicle VIN.

The EVSE 10 receives the data via the RF data communication link 95. Such data would ordinarily include mileage on the electric vehicle, the state of charge of the battery 62, as well as additional data available from the OBDM. The data is time-stamped, stored and forwarded by the EVSE processor 40 as required for various applications and may be transmitted by the EVSE transceiver 44 for further usage.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A method for identifying an electric vehicle connected to EVSE comprising:
   connecting the EVSE via a cable to the electric vehicle;
   applying power from the EVSE to the electric vehicle;
   detecting the flow of current to a battery charger of the electric vehicle;
   obtaining a VIN of the electric vehicle from an OBDM of the electric vehicle;
   transmitting the VIN and a "power-on" signal from the electric vehicle to the EVSE transceiver via RF;
   automatically removing power from the EVSE to the electric vehicle;
   transmitting the VIN and a "power-off" signal to the EVSE via RF;
   processing the VIN and "power-off" signal at the EVSE to confirm the identity of the connected electric vehicle; and
   reapplying power from the EVSE to the electric vehicle to charge the battery power supply.

2. The method of claim 1 wherein the step of detecting the flow of current is accomplished by employing a current flux sensor.

3. The method of claim 1 wherein the steps of applying and removing power further comprises controlling a line contactor.

4. The method of claim 1 further comprising activating an auto-CAM module to obtain the VIN from the OBDM.

5. The method of claim 4 further comprising employing the auto-CAM module to transmit the VIN and "power-on" signal to the EVSE transceiver.

6. The method of claim 1 further comprising detecting a proximity signal from the EVSE, 7. An identification system for identifying an electric vehicle connected to EVSE comprising:
   an EVSE having a cable with a power connector and a pair of power lines and a pilot line, said EVSE further comprising a processor in communication with an RF transceiver and in communication with a contactor interposed across said power lines; and
   an electric vehicle having an inlet for connecting with said power lines and pilot line, and comprising an OBDM in communication with an auto-CAM device which communicates with an OBDM port and has an RF transceiver, a sensor for sensing current in a power line and communicating said sensed power to the auto-CAM device, said power lines connecting with a charger for an on-board power supply, and a controller controlling said charger and communicating with the OBDM,
   wherein said EVSE cable is connected to said electric vehicle inlet and a first RF communication is transmitted from said auto-CAM transceiver to said EVSE RF transceiver to identify the vehicle VIN and indicate that power is supplied to said charger, said processor communicates with said contactor to remove power from said power lines, and a VIN and a second RF communication is transmitted from said auto-CAM transceiver to said EVSE transceiver so that said processor activates said contactor to restore power to said charger for charging the battery supply of the electric vehicle.

8. The identification system of claim 7 wherein said sensor comprises a flux sensor.

9. The identification system of claim 7 wherein said cable has a connector with a proximity switch.

10. A method for identifying an electric vehicle connected to EVSE comprising:
    connecting the EVSE via a cable to the electric vehicle;
    applying power from the EVSE to the electric vehicle;
    detecting the flow of current to a battery charger of the electric vehicle;
    obtaining a VIN of the electric vehicle from an OBDM of the electric vehicle by activating an auto-CAM module;

transmitting the VIN and a "power-on" signal from the electric vehicle to the EVSE transceiver via RF;

automatically removing power from the EVSE to the electric vehicle;

transmitting the VIN and a "power-off" signal to the EVSE via RF;

processing the VIN and "power-off" signal to confirm the identity of the connected electric vehicle; and reapplying power from the EVSE to the electric vehicle to charge the battery power supply.

11. The method of claim 10 further comprising employing the auto-CAM module to transmit the VIN and "power-on" signal to the EVSE transceiver.

12. The method of claim 10 wherein the step of detecting the flow of current is accomplished by employing a current flux sensor.

13. The method of claim 10 wherein the steps of applying and removing power further comprises controlling a line contactor.

14. The method of claim 10 further comprising detecting a proximity signal from the EVSE.

* * * * *